Nov. 10, 1953  E. A. BROWN  2,658,972
MECHANICAL BI-STABLE DEVICE
Filed May 23, 1951  3 Sheets-Sheet 1
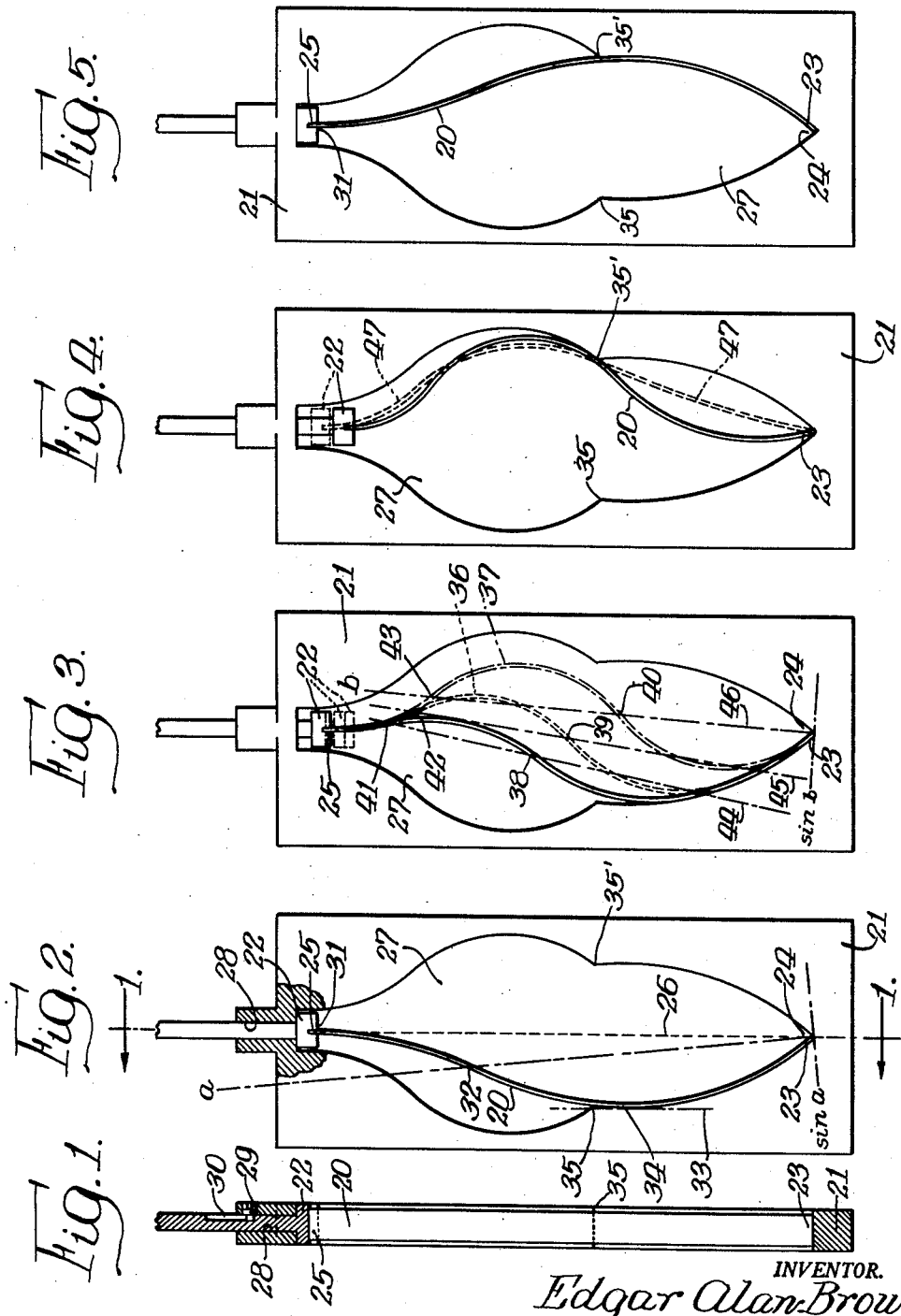
INVENTOR.
Edgar Alan Brown,
BY Fidler, Crouse
& Beardsley
Attys.

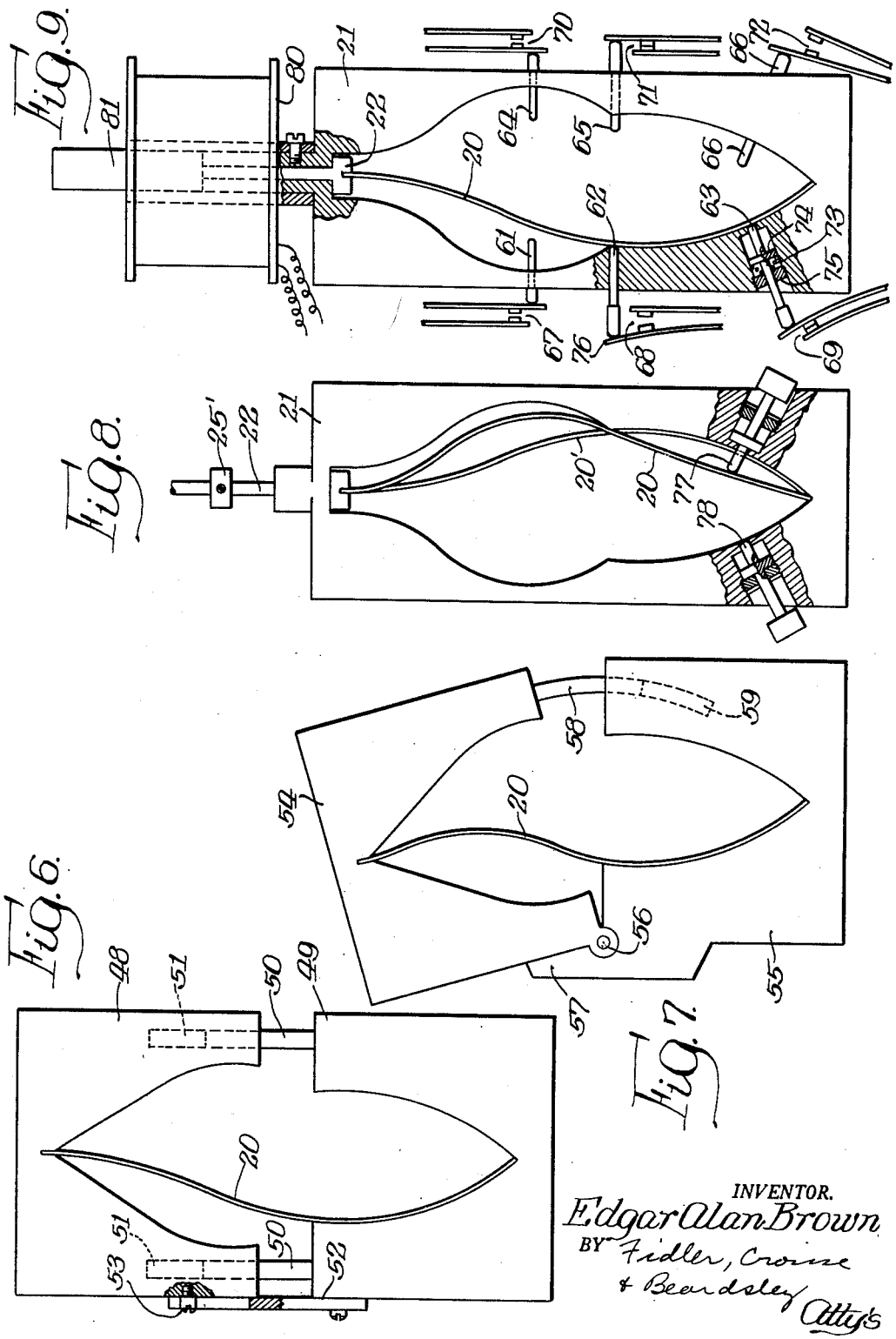

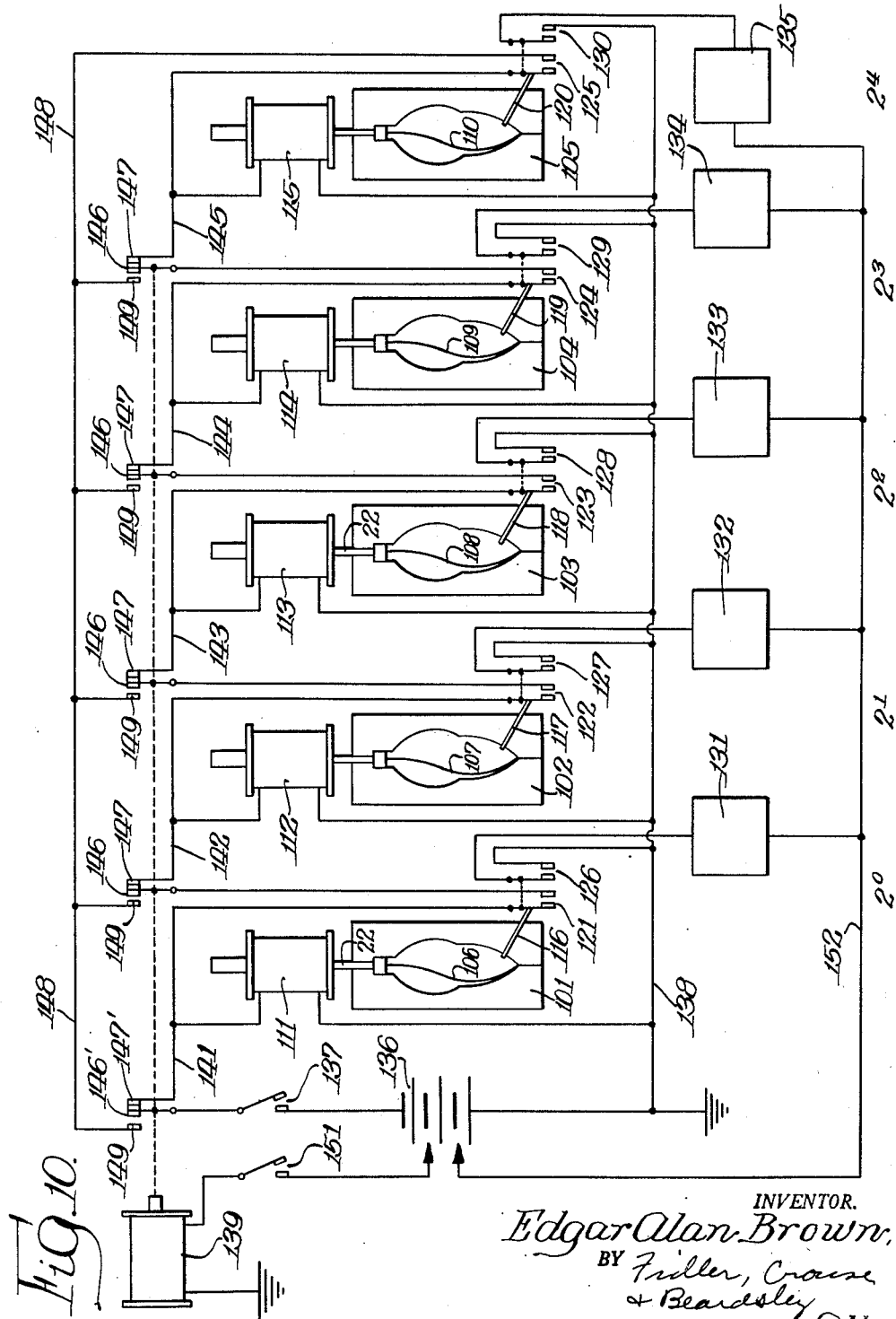

Patented Nov. 10, 1953

2,658,972

UNITED STATES PATENT OFFICE 2,658,972

MECHANICAL BI-STABLE DEVICE

Edgar Alan Brown, Aldan, Pa., assignor to Burroughs Adding Machine Company, Detroit, Mich., a corporation of Michigan Application May 23, 1951, Serial No. 227,924

8 Claims. (Cl. 200—87)

1

This invention relates to a new mechanical bi-stable device, that is, to a new mechanical device which has two stable conditions to which it will be operated alternately by application of successive force pulses to it.

An object of the present invention is to provide a novel and very simple mechanical bi-stable device.

A further object is to provide a mechanical bi-stable device having a minimum number and mass of moving parts and having great rapidity and reliability of operation and high durability.

A further object is to provide a novel binary counter employing the new mechanical bi-stable device and characterized by great simplicity, reliable accuracy, rapid operation and ruggedness.

Prior mechanical bi-stable devices are relatively complex and, because of the number and mass of the moving parts thereof, do not have desirable rapidity of operation, and are subject to wear which renders them unreliable and inaccurate in operation.

The mechanical bi-stable device of the present invention is of extremely simple and durable structure and operates with great rapidity and reliability. It has many uses including but not limited to known uses of prior mechanical bi-stable devices, but because of its extreme simplicity, durabality and rapid and reliable operation, it is especially suited for uses in which those qualities are of great importance as, for example, in counting apparatus. The present invention further provides a new, electro-mechanical, binary counter of great simplicity, reliable accuracy, rapid operation and ruggedness.

The foregoing and other objects and advantages of the invention will become apparent from the following description in conjunction with the accompanying drawings in which:

Figs. 1 and 2 are, respectively, a vertical section and a front elevation and partial section, of a mechanical bi-stable device in accordance with the present invention, the section of Fig. 1 being taken on the line 1—1 of Fig. 2, and the device being shown in one of its two stable conditions;

Figs. 3 and 4 are front elevations similar to Fig. 2 but show the device at different times during an operation thereof;

Fig. 5 is a front elevation similar to Fig. 2 but shows the device in the other of its two stable positions after completion of the operation depicted in Figs. 3 and 4;

Figs. 6, 7, 8 and 9 are front elevations of modified forms of bi-stable device in accordance with the invention; and

2

Fig. 10 is a circuit diagram of a binary counter in accordance with the present invention and utilizing electromagnetically operated mechanical bi-stable devices in accordance with the invention.

In accordance with the present invention, an initially straight, flat, elastically flexible spring member 20 (Figs. 1 to 5) is supported at its opposite ends by two supports 21 and 22. The member 20 may advantageously be a straight flat length of spring steel ribbon, such as a length of watch-spring steel, the brand currently identified by the registered trade-mark "Elgiloy" being eminently suitable. One end 23 of the spring member 20 is pivotally supported in its respective one, 21, of the supports, as by engagement of that end of the spring member in a V-shaped groove 24 in that support 21. The other end 25 of the spring member 20 is rigidly secured in the other support 22 in such manner that if the spring were permitted to assume a position in which it would be free of stresses, it would lie flat in the plane of Fig. 1, i. e., in a plane containing the axis of pivotal support of the opposite end 23 of the spring member 20, and indicated by the line 26 in Fig. 2. One of the supports 21 or 22, preferably the support 22 which is rigidly secured to the spring 20, is mounted for limited movement toward and from the pivotally supported end 24 of the spring member.

Preferably, the support 21 is formed as a frame or housing having an opening 27 accommodating the spring member 20, one end of which opening forms the groove 24. The movable support member 22 will then be mounted in a bore 28 extending through the housing at the opposite end of the opening 27 and aligned with the vertex of the groove 24. The movement of the member 22 is limited as by means of a screw stud 29 (Fig. 1) threaded through the side of the frame 21 and extending into a longitudinal groove 30 formed in the member 22. Alternately, the longitudinal movement of the member 22 may be limited by engagement of the frame 21 alternately with the enlarged inner end of the member 22 and with a collar 25' (Fig. 8) on the reduced stem of the member 22. The outward limit of movement of the member 22 is such that the ends of the spring member 20 are maintained closer together than the length of the spring member 20, whereby the spring member 20 is forced into a flexed form such as shown in solid line in Fig. 2. It will be readily apparent that the spring member 20 may alternatively and equally well be bowed out on the opposite side of the plane 26 as shown in Fig. 5. In either case the spring member 20, from its pivoted end 24 to its juncture 31 with the member 22, if not laterally confined, will assume a curved form which, for present purposes, may be assumed to approximate a portion of a sine curve having, for the solid line curve 20 of Fig. 1, the axes $a$ and sin $a$ and extending from 0° at the vertex of the groove 24 to a point somewhat short of 270°. A point 32 of zero curvature will be found on the spring member 20 at its intersection with the $a$ axis, corresponding to the 180° point on the curve. A line 33 drawn in the plane of Fig. 2 and parallel to the plane of Fig. 1 (line 26 of Fig. 2) will be tangent to the curve of the spring member 20 at a point 34 which is in alignment with the point 32 and the juncture 31 of the spring member with the member 22. The portion of the curve of the spring member 20 from the point 31 to the point 34 will be symmetrical about the point 32.

Movement of the member 22 inwardly (downwardly in Figs. 1–5), if the spring member 20 were not laterally outwardly confined, would cause the spring member to bow outwardly farther, i. e., away from the plane 26. However, in accordance with the present invention, a portion of the spring member 20 from its pivoted end 23 to a point 35 somewhat beyond the point 34 is confined against such further movement outwardly, i. e., away from the plane 26. Such confinement is preferably provided by the surface of the frame 21 surrounding the opening 27. Such confinement need not be continuous along the entire length of the spring from the end 24 to the point 35 but may be provided, as by means of a series of abutments (not shown), at a series of points spaced along the outer face of the spring member 20 at points which are sufficiently close together in relation to the stiffness of the spring member to prevent the latter from bowing further outwardly between such points of confinement.

If such confinement extended from the pivoted end 23 only to the point 34, then the unconfined portion from 34 to 31 would be symmetrical about the point 32 so that, upon inward movement of the member 22, there would be equal probabilities of the portion of the spring member between the points 34 and 31 being forced either toward or from the plane 26. However, the confinement against further movement away from the plane 26 extends to the point 35 which is sufficiently away from the point 34 in the direction of point 32 to insure that the inward movement of the member 22 will cause the portion 31 to 35 to swing inwardly toward the plane 26.

Such further flexing of the spring member 20 by inward movement of the member 22 will cause the spring to "peel" away from the confining wall of the opening 27 and cause the curved shape of the spring to change progressively through a series of forms, three of which are shown in Fig. 3, one by the solid line 20 and two others by the dotted lines 36 and 37. As the inward movement of the member 22, the concomitant change of curvature of the spring member 20, and the "peeling" away from the confining wall of the opening 27 progress, the point of zero curvature previously located at point 32 shifts progressively along the spring member 20 toward the pivoted end 23 as indicated at points 38, 39 and 40 on curves 20, 36 and 37 of Fig. 3. Another point of zero curvature enters the other end of the spring member 20 and also progressively shifts toward the pivoted end 23. This latter point of zero curvature is indicated at 41, 42 and 43 in Fig. 3. If a straight line is run through the above-mentioned two points of zero curvature on each of the curve forms successively assumed by the spring member 20, it will be found that such line swings progressively toward the pivoted end 23 of the spring as indicated by the lines 44, 45 and 46 in Fig. 3. When that line, as indicated by the line 46, reaches the pivoted end 23 of the spring member 20, the curve form will be approximately that of a portion of the curve of sin $b$ from 0° at the pivoted end 23 of the spring member to somewhat less than 450° at point 31, the $b$ axis of such curve coinciding with the line 46 and the point of "peeling" of the spring member 20 from the previously confining wall of the opening 27 will also have progressed to the vertex of the notch 24. Theoretically, the spring member 20 will at that instant reach a condition of instability such that it will snap over to the form and position shown in solid line in Fig. 4.

The foregoing portion of the explanation of the action of the spring member, for the sake of simplicity, assumes a perfect spring member and assumes that the confining walls from the notch 24 to the points 35 and 35' exactly coincide with forms and positions which the outward faces of the spring member would assume in stable rest positions of the device, such as shown in Figs. 4 and 5, even if the spring member were free from lateral confinement. Even when the confining walls are formed as nearly as is practically possible to the above assumed configuration, the spring member 22 will reach the unstable equilibrium condition, from which it will start to snap toward the solid line position of Fig. 4, somewhat before the spring member has "peeled" completely away from the confining wall of the frame 21, that is, somewhat before the line through the two inflection points, or points of zero curvature, intermediate the ends of the spring member reaches the end 23 of the spring member in the vertex of the notch 24.

Preferably, the member 22 is prevented from moving inwardly more than a short distance farther than required to cause the spring member to pass through the condition of instability just described. The groove 30 is preferably just long enough to secure that result.

When the pressure which moves the member 22 inwardly is withdrawn from it, the member 22 is returned outwardly (upwardly in Figs. 1–5) by the spring member 20. During such outward movement of the member 22, the spring member 20 progressively changes its curvature through a succession of forms, one intermediate form being shown in dotted line at 47 in Fig. 4. When the member 22 reaches the outward limit of its return movement, the spring member 20 is in the form and position shown in Fig. 5.

It will be apparent that another reciprocation of the member 22 will cause the spring member 20 to move from the form and position of Fig. 5 back to the form and position of Fig. 2. In such second operation of the device, the changes of form and positions of the spring member 20 will have the same appearance as those which occurred in the first above-described operation would have had if viewed from behind the plane of Figs. 2 to 5.

Thus, successive reciprocations of the member 22 will cause the spring member 20 to be operated alternately from each of its two stable positions of Figs. 2 and 5 to the other of such positions.

The foregoing explanation, for the sake of simplicity, omits consideration of effects of inertia and momentum and some other factors which will or may cause the action of the spring member to vary somewhat from complete correspondence with that described above without injuring the effectiveness of the device as a bi-stable means. It will be apparent that with the device as shown in Fig. 4, further inward movement of the member 22, if permitted, would cause the portion of the spring member 20 between its pivoted end and the point 35' to increase its curvature so that, adjacent the pivoted end 23, a portion of the spring member may again be "laid on" the previously engaged confining wall of the opening 27. If such movement of the member 22 is sufficiently rapid, the last-mentioned portion of the spring member will not have the opportunity to "peel" fully from the wall of the opening 27 during inward movement of the member 22 but will remain in contact with the confining wall above the vertex of the notch 24 until the outward return movement of the member 22 has started.

Variations in exact form and dimensions may cause the action of the spring member to vary more or less from complete identity with that described above without seriously interfering with the effectiveness and reliability of the device as a bi-stable means and in fact, such variations may be intentionally secured for useful purposes. For example the configuration of the laterally confining walls from notch 24 to the points 35 and 35' and the locations of these points may be chosen so that, starting from the condition of Fig. 1, inward movement of the member 22 will cause the spring to snap over against the point 35' without fully peeling away from the lower portion of the wall 24, 35. Such a variation may be used to secure a desired timing of the operation of an output member by the portion of the spring member near its end 23 as will become clear after consideration of Fig. 9.

That portion of the opening 27 in which the portion 31–35 (Fig. 2) of the spring member 20 operates may be of any desired contour so long as it does not seriously impede operation of the spring member in generally the above-described manner. In Figs. 2–5, the portion of the opening 27 above the points 35 and 35' is shown as being of a size and form such that, in every position of the spring member, clearance is provided between the spring member and the frame 27 at all points above the points 35 and 35'. However, a considerable amount of interference of the frame above the points 35 and 35' with the free movement of the upper portion of the spring member may exist without preventing effective operation of the device generally in the manner described above, even though the curve forms of the spring member may be somewhat altered.

It will be apparent that the ratio of longitudinal dimensions to transverse dimensions may be varied greatly in either direction from the proportions shown in Fig. 1. In other words, the amplitude of throw of the spring member 20 relative to the length of the spring member can be varied from a very small value to a value considerably greater than shown in Fig. 1, provided, of course, that a spring member of sufficient elastic, flexibility is chosen. The flexing of the spring member must not stress it beyond its limit of elasticity and, preferably, the stressing of the spring member should be far below that limit.

Tolerances are much more than large enough to permit of manufacture of the device in very inexpensive manners.

The frame 21 may be of various constructions and formed of one piece or of a plurality of pieces and the front and/or rear sides of the opening 27 may be open or closed in any desired manner. The frame may, for example, comprise two frame members 48 and 49 as shown in Fig. 6, and means, such as the pins 50 secured in one (49) of said frame members and slidably fitting in bores 51 in the other, 48, of such frame members to permit reciprocation of the frame members toward and away from each other to cause operation of the spring member 20 in generally the same manner as previously described. The relative reciprocation of the members 48 and 49 may be limited by any suitable means such as a link 52 secured to one of the members 48, 49, and slotted to cooperate with a screw stud 53 secured in the other of said members.

Though the device of Figs. 2–5 is shown as being symmetrical with reference to a median plane 26, such symmetry is not a necessity. For example, two frame members 54 and 55 (Fig. 7) may be hinged together at one side, as at 56, to permit the frame members to be moved toward and from each other to operate the spring member 20 in generally the same manner as previously described. The relative rocking movements of the frame members 54 and 55 may be limited by engagement of one against a projecting portion 57 of the other. Also, a guide pin 58 secured in the one frame member may slide in a bore 59 in the other.

Various other suitable forms of construction will readily be apparent.

The mechanical bi-stable device of the present invention may be used for many purposes and in various ways. For example, the device may, as shown in Fig. 9, have one or a plurality of bores formed in the frame member 21 with a plunger 61, 62, 63, 64, 65 and 66 slidable in each of such bores, each plunger being long enough to project into the opening 27 and outwardly from the outer side of the frame member 21. The plungers may be utilized to operate desired devices such as electric switches 67, 68, 69, 70, 71 and 72. The plungers may each be urged inwardly either by a light compression spring 73 coiled about the plunger and confined between a shoulder 74 on the plunger and a bushing 75 threaded into the bore in the frame 21, or by external yielding means such as, for example, a spring blade 76 of the switch operated by said plunger. It will readily be understood that any of the switches may be so arranged for operation by the respective plunger that its contacts will be either opened or closed, as may be desired, by the outward movement of the plunger by the spring member 20. In Fig. 9, switches 67, 69, 70 and 72 are self-opening but closed by outward movement of the associated plungers by the spring member 20, and switches 68 and 71 are self-closing but opened by outward movement of the associated plungers.

It will be apparent that as different portions of the spring member 20 move in different directions and at different times in the operation of the device, the plungers 61–66 will also move in different directions and at different times so that, consequently, the switches 67–72 will be opened and closed at different times in a sequence which will be determined by the normal positions of the inner ends of the plungers relative to different portions of the spring member. In the arrangement shown in Fig. 9 and starting with the spring member 20 in the position shown, the switches 67, 68, 70 and 72 will be open and the switches 69 and 71 closed. As the member 22 is depressed, the switch 68 will close, then the switch 70 will be closed, then the switch 69 will open and the switch 71 will be opened. As the member 22 returns to normal, the switch 72 will be closed and the switch 70 will open. Upon another reciprocation of the member 22, the switch 71 will close, then the switch 67 will be closed, then the switch 72 will open, then switch 68 will be opened, then the switch 69 will be closed and finally the switch 67 will again open. If desired, the plungers 63 and 66 may be so dimensioned and arranged, or the extent of inward movement of the member 22 may be sufficient, or the action of the spring member may be varied to cause operations of the switches 69 and/or 72 to be delayed until after the inward movement of the member 22 has been completed and the outward return movement thereof has started. The great number of variations which are possible will readily be apparent. It will be apparent also that any or each of the plungers 61–66 may operate or control more than one pair of contacts.

It has further been found that the operation of the spring member 20 from either of its stable forms and positions to the other of such forms and positions by each reciprocation of the member 22 may readily be inhibited or prevented without interfering with the reciprocation of the latter. For example a further plunger 77 (Fig. 8) may be slidably mounted in a bore in the frame 21 so that, when desired, it may be projected into the opening 27 in the mid-range between the point 35 or 35' and the groove 24. When moved inwardly to project into the opening 27, the plunger 77 will prevent the spring member 20 from having the form and position shown in Fig. 5. If the spring member 20 has the form and position shown in Fig. 5 just before inward movement of the plunger 77, the latter will shift the spring member to the form and position of the spring member 20 of Fig. 8. If, while the plunger 77 and spring member 20 have the positions shown in Fig. 8, the member 22 is moved inwardly, the spring member 20 will be moved to the form and position shown in Fig. 4 and, upon return of the member 22 to normal position, the spring member 20 will again return to the form and position of the spring member 20 of Fig. 8 instead of moving over to its other stable form and position. A second inhibitor 78 may also be provided on the other side of the spring member 20. Such inhibiting means is useful for insuring that the spring member 20 will be in a predetermined one of its stable positions following a reciprocation of the member 22 regardless of which of its stable positions the spring member previously occupied. If the spring member is not in the position of the spring member 20 of Fig. 8 when the member 22 is reciprocated while the inhibitor 77 is in its active inward position, the latter will not prevent the spring member 20 from being operated to that position but if the spring member 20 is in that position, the inhibitor will prevent the spring member from being operated to the other of its stable positions. Thus, with the inhibitor 77 or 78 in its active position, a reciprocation of the member 22 will insure that the spring member will be in the desired position.

The device may also be provided with two spring members 20 and 20' as shown in Fig. 8 arranged side by side and both secured to the same operating member 22. Normally, if both spring members start with corresponding forms and positions, they will be operated simultaneously upon each reciprocation of the operating member 22 and will remain in step. If, after any number of operations, the inhibitors 77 and 78 are moved to their inward effective positions, further reciprocations of the operating member 22 will continue to operate the spring member 20' from each stable position to the other alternately but will not so operate the spring member 20 while the inhibitors 77 and 78 remain in effective position. Thus, the device of Fig. 8 constitutes a means by which information accumulated up to a chosen time may be retained without alteration while further information continues to be accumulated.

The device may be operated by any desired means and in any desired manner as dictated by the use to which it is put. Operation of the member 22 may be effected by mechanical or electromagnetic means, such as a solenoid as shown in Fig. 9. The winding spool or bobbin 80 may be secured to the frame 21 or both may be secured to any suitable common support (not shown) and the movable magnetic core member 81 may be secured in any suitable manner to the operating member 22 so that upon each energization of the winding of the solenoid, the member 22 will be depressed to its lower limit.

A new and advantageous binary counter employing electromagnetically operated mechanical bi-stable devices in accordance with the present invention is shown in Fig. 10. The counter comprises a series of the new mechanical bi-stable devices 101, 102, 103, 104 and 105, there being one such device for each of the stages or orders $2^0$, $2^1$, $2^2$, $2^3$ and $2^4$ of the counter. The spring members thereof are numbered 106, 107, 108, 109 and 110 respectively. The movable spring-operating member 22 of each is secured to the armature or movable core member of an operating solenoid 111, 112, 113, 114 or 115, respectively. Each of the devices 101 to 105 has one switch operating plunger 116, 117, 118, 119 or 120, respectively, and each of those plungers, when its associated spring member 106, 107, 108, 109 or 110 moves from its left-hand stable position of Fig. 10 to its right-hand stable position, closes a pair of self-opening transfer or carry contacts 121, 122, 123, 124 or 125, respectively, and also closes a pair of self-opening contacts 126, 127, 128, 129 or 130, respectively, controlling a respective one of a plurality of indicator or signal devices 131, 132, 133, 134 or 135. When the associated spring member 106—110 is being operated from either of its stable positions to the other, the opening or closing of the associated contact pair 121—125 does not occur until the operating member 22 for that spring member has been fully depressed and at least partially restored.

The pairs of contacts 121—125 and the windings of the solenoids 111—115 are connected in circuit as shown in Fig. 10 with a desired source, such as the battery 136 and counting switch 137, of electric current impulses to be counted. The same battery 136, or a portion of it, may also energize the indicator or signal devices 131—135 through connections controlled by the pairs of contacts 126—130 as shown in Fig. 10.

One terminal of the battery 136 is connected to a grounded conductor 138 and the other terminal is connected to one contact of the counting switch 137. One terminal of the winding of each solenoid 111—115 is connected to the conductor 138 and the other terminal is connected to the corresponding one of a series of sections of a counting line conductor comprising a series of sections 141, 142, 143, 144 and 145 corresponding in number to the number of orders of the counter. Each counting line section 141—145 is connected to one contact of the contact pairs 121, 122, 123, 124 or 125 of the corresponding order of the counter. The other contact of each of said pairs, except the highest order pair 125, is connected to a respective one of a series of movable contacts 146 of a resetting or zeroizing relay 139. Also, the remaining contact of the counting switch 137 is connected to another movable contact 146' of the zeroizing relay 139. Each of the movable contacts 146 is normally closed to a contact 147 connected to the next highest order section 142, 143, 144 or 145 of the counting line conductor. The contact 146' is normally closed against a contact 147' connected to the lowest order section 141 of the counting line conductor. The remaining contact of the contact pair 125 is connected to a zeroizing conductor 148 having a series of contacts 149 connected thereto, the latter contacts being so arranged that, when the zeroizing relay 139 is energized and the movable contacts 146 and 146' have broken from the contacts 147 and 147', the movable contacts 146 and 146' will close against respective ones of the contacts 149.

The winding of the zeroizing relay 139 is connected at one end to ground and at the other end to one contact of a zeroizing switch 151, the other contact of which is connected to a tap on the battery 136.

The contact pair 126, 127, 128, 129 or 130 for each order and the signal or indicator device 131, 132, 133, 134 or 135 for the same order are connected in series between the conductor 138 and a conductor 152 connected to a tap on the battery 136.

In the normal starting condition of the counter, as shown in Fig. 10, all of the springs 106—110 are in their left-hand stable positions, all the contact pairs 121—125 are open so that each section 141—145 of the counting line conductor is isolated from the adjacent sections, all the contact pairs 126—130 are open so that all the indicator or signal devices 131—135 are off, the zeroizing switch 151 is open so that all the contacts 146 and 146' are disengaged from the contacts 149 and closed with respective ones of the contacts 147 and 147'. The counting switch 137 is also open.

When the counting switch 137 is closed to initiate the first counting pulse, the battery 136 is connected to the first order section 141 of the couning line and the first order solenoid 111 is energized and moves its armature downward and thus causes its spring 106 to be operated from the position of the spring 20 of Fig. 2 to the full line position of the spring 20 of Fig. 4. The plunger 116 is not thereby operated. When the counting switch 137 is again opened, the solenoid 111 is de-energized, its armature restores upwardly and the spring 106 moves to the position of the spring 20 of Fig. 5, thereby operating the plunger 116 to close contact pair 121 to connect the second order section 142 of the counting line to the first order section 141. The plunger 116 also closes the contact pair 126 to energize indicator 131 to indicate a count of $2^0$.

When the counting switch 137 is again closed, the connected-together first and second sections 141 and 142 of the counting line conductor are connected to the battery so that both of the solenoids 111 and 112 are energized. The plunger 116 does not permit the contact pairs 121 and 126 to reopen until the armature of solenoid 111 has been fully depressed and partially restored and plunger 117 is not operated to close contact pairs 122 and 127 until the armature of solenoid 112 has been fully depressed and partially restored, i. e., until after counting switch 137 is reopened, at which time spring 106 returns to its left-hand stable position while the spring 107 moves to its right-hand stable position. At that time the only indicator device energized will be the indicator 132, indicating a count of $2^1$. Counting line sections 142 and 143 will be connected together by contact pair 122 but isolated from counting line section 141 by the opened contact pair 121.

A third closing and opening of the counting switch 137 will cause the solenoid 111, spring 106 and contact pairs 121 and 126 of the first order to be operated exactly as they were by the first closing and opening of that switch. After such third operation of the counting switch, the two indicators 131 and 132 will both be energized to indicate a count of $2^0+2^1$ and the three lowest order sections 141, 142 and 143 of the counting line will be connected together. A fourth operation of the counting switch 137 will, therefore, cause the three lowest order solenoids 111, 112 and 113 to be operated. The solenoids 111 and 112 then operate the springs 106 and 107 again to their left-hand stable positions and the solenoid 113 operates the spring 108 to its right-hand stable position. The counting line sections 143 and 144 will then be connected together through the closed contact pair 123 but the other counting line sections will be separated at the open contact pairs 121, 122, 124 and 125. Only the indicator 133 will be energized, indicating a count of $2^2$.

From the foregoing the operation of the counter for successive further operations of the counting switch 137 will easily be apparent. It will be seen that the eighth operation of the counting switch will cause operation of the four solenoids 111-114 and of their springs 106-109 and that the sixteenth operation of the counting switch will cause operation of the five solenoids 111-115 and springs 106-110. The lowest order solenoid 111 and its spring 106 are operated upon each operation of the counting switch 137, the solenoid 112 and its spring 107 are operated simultaneously with each second operation of the solenoid 111, the solenoid 113 and its spring 108 are operated simultaneously with each second operation of the solenoid 112, and so on. Each operation of any one of the spring members 106-110 reverses it from one to the other of its stable positions and also reverses the "on" or "off" condition of its associated indicator 131-135.

To reset or zeroize the counter at any time it is necessary to close the zeroizing switch 151 and the counting switch 137, then reopen the latter, and finally reopen the switch 151. Thereby the solenoid 139 is energized from the battery 136 and its armature then moves all of the contacts 146 and 146' away from their companion contacts 147 and 147' and closes the contacts 146 and 146' with their companion contacts 149. If any spring member 106–110 is in its right-hand stable position as the switches 137 and 151 are closed, the associated one of the contact pairs 121–124 will be in closed condition and the closing of the switch 137 will complete an energizing circuit for the respective one of the solenoids 111–115 through the contacts 149 and the zeroizing line 148 to operate that spring to return it to its left-hand stable position. Then, the springs 106–115 will all be in their left-hand stable positions, all contact pairs 126–130 will be open so that all indicators 131–135 will be off, and all contact pairs 121–125 will be open so that when the switches 137 and 151 are reopened in that order, the counter is again in the condition shown in Fig. 10 and ready for accumulation of a new count.

I claim:

1. A bi-stable device comprising an elongated elastically flexible spring member, means to support said spring member pivotally at one end to accommodate rocking of the adjacent portion of said spring member about said end, means to support the other end of said spring non-pivotally, means mounting one of said supporting means for movement readily toward and from the other supporting means to operatively reciprocate the thereby supported end of the spring member toward and from the other end thereof, limit means cooperating with the movable supporting means and positioned to hold maximum separation of the ends of the spring member to a distance less than the length of the spring member and thereby cause said spring to be bowed away from a line through the ends of the spring member, confining means located on opposite sides of said line and positioned to block, during each movement of said movable supporting means toward the other supporting means, increased bowing and movement away from said line of the portion of said spring member extending from said pivotally supported end to a point in its length a short distance beyond the point farthest displaced from said line and thereby compel a portion of said spring member nearer to the non-pivotally supported end thereof to be increasingly bowed in the opposite direction and shifted progressively across said line by such movement of said movable supporting means until said spring member reaches an unstable substantially sinuous form and position from which it can spontaneously shift further in the same sense and, upon reverse movement of said movable supporting means to the extent permitted by said limit means, spontaneously transform to the form and position reversed, with respect to said line, from the form and position it had prior to such reciprocation of the movable supporting means.

2. A device according to claim 1, having a stationary support, an output member movably mounted in said support for movement by a portion of said spring member as such portion moves during at least a portion of the operation of said spring member from one normal stable position to the other normal stable position.

3. A device according to claim 2, having at least one other output member movably mounted in said support for movement by another portion of said spring member as said latter portion moves during a different portion of said operation of said spring member.

4. A device according to claim 2, having at least one other output member movably mounted in said support for movement by a portion of said spring member as such portion moves during at least a portion of the operation of said spring member from said other normal stable position to said one normal stable position.

5. A device according to claim 1, having an inhibitor member normally outside of the range of movement of said spring member and mounted for movement to engage said spring member when the latter is in one of its two stable normal positions and shift the portion of said spring member located between said confining means toward said line to a position from which, upon relative movement of said movable supporting means toward the other supporting means while said inhibitor member is in such moved position, the last-mentioned portion of said spring member will bow toward said line and the remainder of said spring member will not shift toward or across said line and said spring member will assume a form and position from which it will, upon return of said movable supporting means to its normal position determined by said limit means, return to the form and position it had prior to such relative reciprocation of said supporting members.

6. A device according to claim 1, having an electromagnetic actuating means including portions movable relatively to each other upon energization of said electromagnetic means, said relatively movable portions being operatively connected with said two supporting means respectively to reciprocate said movable supporting means by successive energizations and de-energizations of said electromagnetic means.

7. A binary counting device for use as a stage in plural stage counter and comprising a bi-stable device as defined in claim 1, an electromagnetic operating device including an electrical operating winding and relatively movable elements connected with said two supporting means, respectively, to reciprocate the movable supporting means toward and from the other supporting means upon energization and de-energization of said winding, first and second input terminals for said stage connected respectively with the opposite ends of said winding and said first terminal being adapted for connection to the first terminals of like counting devices of other stages of such counter, a third terminal adapted for connection to the second terminal of a like counting device of the next higher stage of such counter, and means associated with the second and third terminals of the counting device and operated by movement of said spring member into one of its stable normal positions to electrically connect said second terminal to said third terminal and, by movement of said spring member into the other of its stable normal positions, to disconnect said second and third terminals from each other.

8. A device according to claim 7, having a pair of conductors for connection to an electrically operable indicator means, and contact means associated with said pair of conductors and operable by said spring member to establish electrical connection between said conductors when said spring member is in one of its stable positions and to break said connection when said spring member is in the other of its stable positions.

EDGAR ALAN BROWN.

(References on following page)

References Cited in the file of this patent

UNITED STATES PATENTS

| Number | Name | Date |
|---|---|---|
| 1,676,155 | Pfeifer | July 3, 1928 |
| 2,027,118 | Prosser | Jan. 7, 1936 |
| 2,206,660 | Bryce | July 2, 1940 |
| 2,375,413 | Guenther | May 8, 1945 |
| 2,395,698 | Tiffany | Feb. 26, 1946 |
| 2,440,025 | Singleton | Apr. 20, 1948 |
| 2,442,947 | Blyholder | June 8, 1948 |
| 2,444,042 | Hartley | June 29, 1948 |
| 2,448,230 | Miller | Aug. 31, 1948 |
| 2,479,313 | Clark | Aug. 16, 1949 |
| 2,501,497 | Clark | Mar. 21, 1950 |

OTHER REFERENCES

AIEE Technical Paper 49—148; "Counting With Relays" by G. R. Frost. Copy in Div. 23, May 1949.